United States Patent Office 2,780,660
Patented Feb. 5, 1957

2,780,660
CATALYTIC PROCESS

Edmund Field, Chicago, and Morris Feller, Park Forest, Ill., assignors to Standard Oil Company, Chicago, Ill., a corporation of Indiana No Drawing. Application February 8, 1955,
Serial No. 486,988

11 Claims. (Cl. 260—671)

This invention relates to a process for the introduction of one or more alkyl radicals into benzene or to their attachment to a nuclear carbon atom of an alkylatable tertiary alkylbenzene by catalytic reaction with ethylene, said alkyl radicals containing two carbon atoms or a multiple thereof.

One object of our invention is to provide a catalytic process for the reaction of ethylene with aromatic hydrocarbons such as benzene or nuclearly alkylatable derivatives of benzene substituted by one or more tertiary saturated hydrocarbon radicals (i. e. tertiary hydrocarbon radicals containing no aliphatic olefinic unsaturation) to produce nuclear alkylated derivatives of said aromatic hydrocarbons. Another object is to provide novel catalysts for effecting the alkylation of benzene and nuclear C-alkylation of alkylatable tertiary alkylbenzenes. A further object is to provide a process for introducing an ethyl radical, or an alkyl radical which is a multiple of an ethyl radical, into benzene or an alkylatable benzene which is substituted by one or more tertiary saturated hydrocarbon radicals. The foregoing and other objects and advantages of our invention will become apparent from the ensuing description thereof.

Briefly, the present invention provides a process for introducing alkyl radicals containing two carbon atoms or a multiple of two carbon atoms into a benzenoid hydrocarbon at a nuclear position thereof by effecting contacting of ethylene, a catalyst and benzene, or benzene substituted by one or more tertiary saturated hydrocarbon radicals, under suitable alkylating conditions of time, temperature, ethylene:aromatic hydrocarbon mol ratio, catalyst concentration, etc. The novel catalysts which we employ for effecting said alkylation are hydrides of alkali metals, viz. hydrides of lithium, sodium, potassium, rubidium, cesium, or suitable mixtures thereof. The alkali metal hydrides may be used in conjunction with inert, porous or non-porous solid materials, which may function as supports for said hydrides.

The specific operating variables to be selected in conducting any given alkylation operation within the scope of our invention depend upon the degree of alkylation which is sought, desired extent of conversion, etc., and the selection of these variables is to some extent governed by such considerations as the activity of the particular alkali metal hydride which is selected for use, the physical form of the alkali metal hydride catalyst, the surface:weight ratio of said alkali metal hydride catalyst, whether or not the alkali metal hydride catalyst is employed in conjunction with inert, solid supporting materials, the selected temperature, pressure, reaction period, etc.

A suitable alkylation temperature is employed, usually between about 100° C. and about 350° C. A suitable reaction pressure is selected, most of which is due to the partial pressure of the olefinic alkylating reagent. To secure a desirable rate of alkylation, the reaction pressure is normally set at a value of at least about 200 p. s. i. g., but may range much higher, for example to about 10,000 p. s. i. g., 20,000 p. s. i. g., or even higher pressures. Usually the ethylene partial pressure within the alkylation reaction zone at the selected alkylation reaction temperature will lie between about 500 and about 5000 p. s. i., quite often in the range of about 1000 to about 2000 p. s. i.

The selected reaction period may range upwardly from about one hour in batch reaction equipment and may be as much as 40 hours or, in extreme cases, even longer.

The molar ratio of aromatic hydrocarbon feed stock to ethylene is not critical and can be varied over a broad range, e. g. from about 0.2 to about 20.

The alkali metal hydride catalysts generally increase in activity with increasing atomic weight of the metal therein combined. Therefore the proportion of alkali metal hydride which is employed as the catalyst may be varied in proportion to its relative activity, bearing also in mind the other factors which affect the reaction rate. Usually an alkali metal hydride is employed in our catalytic conversion processes in a proportion between about 0.005 and about 5 percent by weight of the aromatic hydrocarbon which is being alkylated, although higher proportions may be employed, e. g., 10 weight percent or even more.

The process of the present invention can be used to convert a mixture of benzene and ethylene in high ultimate yields to ethylbenzene, 2-phenylbutane, 3-phenyl-3-methylpentane, and the like. The corresponding alkyl groups may be introduced by this process into alkylatable benzenes substituted by one or more tertiary saturated hydrocarbon groups, e. g., t-alkyl or t-cycloalkyl groups. When reference is made herein to tertiary alkyl radicals or tertiary saturated hydrocarbon radicals, one carbon atom of the radicals thus described is attached to a nuclear carbon atom of the benzene nucleus and the remaining three valence bonds of said carbon atom are joined to other carbon atoms of a group lacking ethylenic unsaturation, e. g., a cycloalkyl or an aryl group.

The ethylene may contain inert hydrocarbons, as in refinery gas streams, for example, methane, ethane, propane, etc. However it is preferred to employ as pure and concentrated ethylene charging stocks as it is possible to obtain.

When operating at elevated temperature within the alkylation temperature range, for example about 200° C. to about 350° C., hydrogen may be added to the reaction zone to a partial pressure value between about 20 and about 400 p. s. i. g. The presence of hydrogen within the reaction zone sometimes exerts one or more desirable effects, one of which may be to prevent over-extensive decomposition of thermally unstable metal hydride catalysts at temperatures within the upper portion of the alkylation temperature range.

The aromatic feed stock may be benzene or a tert-alkylbenzene such as tert-butylbenzene, tert-amylbenzene (2-methyl-2-phenylbutane), tert-hexylbenzene (3-methyl-3-phenylpentane), 3-ethyl-3-phenylpentane, 2-phenyl-2-methylhexane and the like. Examples of other suitable charging stocks comprise hydrocarbons containing a benzene ring substituted by a tert-cycloalkyl radical, e. g., 1-methyl-1-phenylcyclopentane, 1-ethyl-1-phenylcyclopentane, 1-methyl-1-phenylcyclohexane, 1-ethyl-1-phenylcyclohexane and the like. Examples of other suitable charging stocks are 2,2-bis-phenylpropane, 2-phenyl-2-cyclohexyl propane and the like. In the aromatic feed stock, the benzene ring may be substituted by more than one tertiary saturated hydrocarbon radical, provided that the resulting aromatic hydrocarbon is alkylatable, i. e. that it contains at least one unsubstituted nuclear carbon atom meta- or para- to said tertiary saturated hydrocarbon substituent and the positions vicinal to said meta- or para-position are not occupied by substituents, such as a tert-alkyl radical, which sterically hinder the desired alkylation reaction. Thus, para-di-tertiary butylbenzene would not be a desirable aromatic hydrocarbon feed stock for our process, whereas meta-di-tertiary butylbenzene would be. Similarly, one might employ 1-methyl-1-(meta-tert-butylphenyl) cyclohexane as the aromatic hydrocarbon charging stock.

The aromatic hydrocarbon may be employed in substantial excess with respect to ethylene in the present process, thus functioning also as a diluent. However, inert diluents such as liquid saturated hydrocarbons may be employed in proportions between about 10 and about 200 volume percent, based on the volume of aromatic hydrocarbon feed stock. Preferably, the selected diluent boils outside the range of either the aromatic feed stock or the desired alkylation products, so that it may be readily separated by fractional distillation of the mixture produced by the catalytic alkylation reaction. Suitable diluents may include n-pentane, n-hexane, iso-octane, saturated naphthas, decalin, white oils, and the like.

It will be appreciated that the process herein described is amenable to a variety of processing expedients normally pursued in chemical engineering practice. The process may be operated batchwise, for example in stirring autoclaves. The process may be operated by passing the reagents through fixed catalyst beds. The process may be operated by slurrying the reagents and catalysts and passing the slurry, which may be suitably diluted with a reaction diluent, through a reaction zone, which may suitably take the form of a pressure-resistant tube or coil, with provisions for multiple-point injection of the ethylene along the length of the reaction zone, and with suitable heat-exchange arrangements to provide for proper or graduated temperature control during the course of the reaction. The reaction products can be separated from the catalyst residue by conventional means such as by hydroclones (cyclones operating upon liquid materials containing finely divided suspended solids), filtration, centrifuging, a combination of the above-mentioned means, or other means known in the art. Unreacted ethylene can readily be separated from the liquid reaction products by depressuring, and can be suitably recycled to the reaction zone, usually without re-purification. Unreacted aromatic feed stock can ordinarily be separated from the alkylation reaction product by fractional distillation and can usually be recycled to the alkylation reaction zone without the need for re-purification.

The following examples are supplied in order to illustrate but not necessarily to limit the process of our invention. The data were obtained through the use of a stainless steel-lined autoclave of 250 ml. capacity provided with an efficient, magnetically-actuated reciprocating stirrer, which provided satisfactory contact between the aromatic hydrocarbon, ethylene and the catalyst. The supported catalysts were pre-formed outside the reactor at the indicated temperatures from the molten alkali metal and powdered supporting material, with vigorous agitation. In each instance the autoclave was charged with the liquid aromatic hydrocarbon and catalyst under an inert gas blanket, the ethylene was introduced and the contents of the reactor were heated with stirring to the indicated temperature and maintained at said temperature for the indicated period of time. Upon completion of the reaction period, the contents of the reactor were allowed to cool to room temperature, gases were bled off through a pressure release valve and the alkali metal hydride was consumed by the addition of a suitable amount of methanol to the reaction mixture. The liquids were then fractionally distilled and in some instances were also subjected to analysis by means of infrared spectroscopy.

*Example 1*

The catalyst was prepared by depositing 1 gram of molten sodium on 10 g. of an activated coconut charcoal and thereafter treating with hydrogen to produce sodium hydride. The autoclave was charged with 100 ml. benzene, the catalyst and ethylene and the contents of the autoclave were heated with stirring to 140° C. The initial ethylene pressure was about 1000 p. s. i. Eethylene was repressured into the autoclave from time to time to compensate for the pressure drop, which was 1310 p. s. i. over the reaction period of 24 hours. In this reaction, 56 volume percent of the benzene was alkylated. Extraction of the spent catalyst yielded no waxy or polymeric materials.

*Example 2*

The catalyst was prepared by stirring 2 g. of molten sodium with 10 g. of an activated adsorptive (gamma) alumina and then treating with hydrogen to produce $NaH-Al_2O_3$. The autoclave was charged with 100 ml. of benzene, and the catalyst and heated to 140° C., while stirring the contents, under an initial ethylene pressure of about 1000 p. s. i. During the reaction period of 6.5 hours there was an ethylene pressure drop of 1490 p. s. i. Distillation of the product liquid showed that 47 volume percent of the benzene was alkylated. Infra-red spectroscopic examination of the alkylate showed that it consists almost entirely of 2-phenylbutane. Some solid waxy material was found in the residual catalyst.

*Example 3*

The catalyst was slightly over 2 grams of KH supported on 10 grams of an activated adsorptive alumina. The reactor was charged with 100 ml. of benzene, the catalyst and ethylene and the contents were heated with stirring to 140° C. under an initial ethylene pressure of about 1000 p. s. i. During the reaction period of 6.5 hours the total ethylene pressure drop was 3545 p. s. i., resulting in alkylation of 70 volume percent of the benzene. The alkylate was found by infra-red spectroscopy to consist almost entirely of 2-phenylbutane. Some waxy material was present in the residual catalyst.

In the following table are presented data obtained in treatments of 100 ml. of benzene with ethylene at 220° C. and 17 hours with lithium hydride catalysts. The amount of LiH was 1.5 g. and the weight of support, in Examples 5 and 6, was 10 g.

| Example | Support | Max. Press., p. s. i. | P, p. s. i. | Percent Conversion of Benzene to Alkylate |
|---|---|---|---|---|
| 4 | none | 1,975 | 775 | 32 |
| 5 | charcoal | 1,540 | 440 | 20 |
| 6 | $Al_2O_3$ | 1,375 | 575 | 35 |

In each of the above runs substantial alkylation of the benzene to alkylate occurred. In addition, it was noted that the residual catalyst contained some waxy material.

*Example 7*

The reactor was charged with 50 ml. of C. P. benzene, 2.0 g. sodium hydride, 0.1 g. of lithium aluminum hydride and pressured with dried commercial ethylene ($CO_2$-free) to 400 p. s. i. at room temperature, thereafter heated to 180° C. for one-half hour and thereafter brought to the reaction temperature of 230° C., thereby obtaining a total ethylene pressure drop of 4950 p. s. i. g. Ethylene addition to the reactor was continued at the reaction temperature to maintain an ethylene partial pressure of 900–1000 p. s. i. g. The reaction period was 27 hours. As a result of the reaction, a solid product was produced to the extent of 0.92 g. per g. of catalyst, together with 8.5 ml. of alkylation products of which the molar percentages were: ethylbenzene, 36; 2-phenylbutane, 12; and higher molecular weight alkylates, 52. The alkylate contained some diphenyl, which was isolated; its identity was proved by a mixed melting point determination (no depression) with an authentic sample and by a true boiling point determination.

*Example 8*

Finely dispersed potassium hydride was prepared by agitating 2 g. of potassium in 50 g. of a highly purified petroleum white oil in a fluted flask with a high speed (10,000 p. p. m.) stirrer at about 100° C. The dispersion was transferred under an inert gas blanket to a stirred stainless steel autoclave and pressured with hydrogen at 1000 p. s. i. and 250° C. to produce potassium hydride. The mixture was cooled under hydrogen to room temperature, 50 ml. of benzene was introduced and thereafter 34 g. of ethylene. Ethylation was effected at 140° C. over a period of 8 hours to yield 90 v. percent of alkylate, based on benzene charged. The calculated ethylene consumption was 82.4 w. percent, based on ethylene charged.

*Example 9*

The catalyst was prepared by coating 10 g. of commercial activated coconut charcoal (Burrell) having a particle size distribution between 12 and 20 mesh per inch with 2 g. of molten sodium at 275°, while stirring, followed by conversion of the supported sodium to sodium hydride by treatment with hydrogen at atmospheric pressure for one-half hour. The autoclave was charged with the catalyst, 0.32 mol of t-butylbenzene and 0.8 mol of ethylene. Reaction was effected at 150° C. for 18 hours. The maximum pressure was 910 p. s. i. g. and the pressure drop during the reaction was 330 p. s. i. At the end of the reaction period, the reactor was allowed to cool to room temperature, gases were vented and the liquid products were distilled, followed by infrared analysis of the alkylation products. It was found that 25 mol percent of the t-butylbenzene was converted to nuclear ethyl derivatives and, more specifically, that equal amounts of m-ethyl and p-ethyl t-butylbenzenes were produced.

Although the alkylation process of our invention has been described with specific reference to certain carbocyclic benzenoid hydrocarbons, it may be applied to heterocyclic aromatic compounds having similar chemical properties as regards substitution reactions, for example, pyridine, quinoline, pyrrole, thiophene, benzothiophene and substitution derivatives of such heterocyclic aromatic compounds in which the substituent is a tertiary saturated hydrocarbon radical.

The products of the present alkylation process are susceptible of many chemical conversions and ultimate industrial uses, for example, by treatment thereof with nitrating, sulfonating, halogenating, metalating, and other conversion reagents.

This application is a continuation-in-part of our application for United States Letters Patent, Serial No. 311,806, filed on September 25, 1952.

Having thus described our invention, what we claim is:

1. A process for the nuclear alkylation of an aromatic hydrocarbon selected from the class consisting of benzene and benzene substituted by at least one tertiary saturated hydrocarbon radical and containing an alkylatable nuclear carbon atom, which process comprises contacting a hydrocarbon feed stock whose reactive components initially consist essentially of said aromatic hydrocarbon and ethylene with a catalyst consisting essentially of the hydride of an alkali metal, effecting said contacting under nuclear alkylation conditions, and recovering an alkylated aromatic hydrocarbon thus produced from the reaction mixture.

2. The process of claim 1 wherein said aromatic hydrocarbon is benzene.

3. The process of claim 1 wherein said aromatic hydrocarbon is benzene containing at least one tertiary saturated hydrocarbon radical and containing also an alkylatable nuclear carbon atom.

4. The process of claim 1 wherein said aromatic hydrocarbon is a tert-alkylbenzene containing an alkylatable nuclear carbon atom.

5. A process for the nuclear alkylation of an aromatic hydrocarbon selected from the class consisting of benzene substituted by at least one tertiary saturated hydrocarbon radical and containing an alkylatable nuclear carbon atom, which process comprises contacting a hydrocarbon feed stock whose reactive components initially consist essentially of said aromatic hydrocarbon and ethylene with a catalytic proportion of at least about 0.005 weight percent, based on the weight of said aromatic hydrocarbon, of a catalyst consisting essentially of a hydride of an alkali metal, effecting said contacting under suitable nuclear alkylation conditions including a temperature sufficient to induce substantial nuclear alkylation and not in excess of about 350° C. under superatmospheric pressure for a period of time sufficient to effect substantial nuclear alkylation, and recovering an alkylated aromatic hydrocarbon product thus produced from the reaction mixture.

6. The process of claim 5 wherein said hydride is lithium hydride.

7. The process of claim 5 wherein said hydride is sodium hydride.

8. The process of claim 5 wherein said hydride is potassium hydride.

9. The process of claim 5 wherein said catalyst is an alkali metal hydride supported upon an activated coconut charcoal.

10. The process of claim 5 wherein said catalyst is an alkali metal hydride supported upon an activated alumina.

11. A process for the alkylation of benzene, which process comprises contacting a hydrocarbon feed stock whose reactive components initially consist essentially of benzene and ethylene with between about 0.005 and about 10 percent by weight, based on the weight of benzene, of an added catalyst consisting essentially of the hydride of an alkali metal, effecting said contacting under nuclear alkylation conditions including a suitable temperature between about 100° C. and about 350° C. under an ethylene pressure of at least about 200 p. s. i. and for a period of time sufficient to effect substantial nuclear alkylation, and recovering alkylation products comprising a substantial proportion of 2-phenylbutane from the reaction mixture thus produced.

References Cited in the file of this patent

UNITED STATES PATENTS

| | | |
|---|---|---|
| 2,158,071 | Hansley | May 7, 1948 |
| 2,448,641 | Whitman | Sept. 7, 1948 |
| 2,548,803 | Little | Apr. 10, 1951 |
| 2,576,311 | Schlesinger et al. | Nov. 27, 1951 |